United States Patent
Yamamoto et al.

(10) Patent No.: US 11,982,639 B2
(45) Date of Patent: May 14, 2024

(54) MAGNETIC MARKER DIAGNOSTIC SYSTEM AND DIAGNOSTIC METHOD

(71) Applicant: Aichi Steel Corporation, Tokai (JP)

(72) Inventors: Michiharu Yamamoto, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 469 days.

(21) Appl. No.: 17/431,711

(22) PCT Filed: Feb. 21, 2020

(86) PCT No.: PCT/JP2020/007251
§ 371 (c)(1),
(2) Date: Aug. 18, 2021

(87) PCT Pub. No.: WO2020/171232
PCT Pub. Date: Aug. 27, 2020

(65) Prior Publication Data
US 2022/0120710 A1   Apr. 21, 2022

(30) Foreign Application Priority Data
Feb. 23, 2019 (JP) .................... 2019-031100

(51) Int. Cl.
*G01N 27/83* (2006.01)
*E01C 23/16* (2006.01)
(Continued)

(52) U.S. Cl.
CPC .......... *G01N 27/82* (2013.01); *G06T 7/0002* (2013.01); *G06T 7/13* (2017.01); *G06T 7/73* (2017.01);
(Continued)

(58) Field of Classification Search
CPC ...... G01N 27/82; G01N 27/83; G06T 7/0002; G06T 7/13; G06T 7/73;
(Continued)

(56) References Cited

U.S. PATENT DOCUMENTS 9,784,843 B2 * 10/2017 Dolinar .................. G01S 19/14
2002/0022926 A1   2/2002 Suzuki
(Continued)

FOREIGN PATENT DOCUMENTS

EP      3418845 A1    12/2018
JP    2000-276691 A   10/2000
(Continued)

OTHER PUBLICATIONS

Ty A. Lasky et al., Design and Development of an Infrastructure Diagnostic Vehicle(IDV) for AHS, Nov. 1, 1998, California AHMCT Program Research Report UCD-ARR-98-11-01-01 (Year: 1998).*
(Continued)

*Primary Examiner* — Vu Le
*Assistant Examiner* — Lei Zhao
(74) *Attorney, Agent, or Firm* — XSENSUS LLP (57) ABSTRACT

A diagnostic vehicle (1) which diagnoses operation situations of magnetic markers (10) laid in or on a traveling road so as to be magnetically detectable by a vehicle includes sensor unit (11) which obtains a one-dimensional magnetic distribution by measuring a magnitude of magnetism with which any of magnetic markers (10) acts therearound, line sensor camera (13) which obtains a marker image, which is one-dimensional image information, by imaging magnetic marker (10), and diagnosing unit (15) which determines the presence or absence of a flaw in magnetic marker (10) based on a comparison between a magnetic distribution and the marker image.

18 Claims, 10 Drawing Sheets

(51) Int. Cl.
*G01N 27/82* (2006.01)
*G06T 7/00* (2017.01)
*G06T 7/13* (2017.01)
*G06T 7/73* (2017.01)
*G08G 1/16* (2006.01)
*G05D 1/00* (2006.01)

(52) U.S. Cl.
CPC .. *G05D 1/0259* (2013.01); *G06T 2207/30204* (2013.01); *G06T 2207/30256* (2013.01)

(58) Field of Classification Search
CPC ........... G06T 2207/30204; G06T 2207/30256; G05D 1/0259; E01C 23/16; G08G 1/167
See application file for complete search history.

(56) References Cited

U.S. PATENT DOCUMENTS

2018/0283904 A1   10/2018   Yamamoto et al.
2020/0133299 A1*  4/2020    Yamamoto ............. G01C 21/28

FOREIGN PATENT DOCUMENTS

| JP | 2002-63682 A | 2/2002 |
| JP | 2005-202478 A | 7/2005 |
| JP | 2017-83189 A | 5/2017 |
| KR | 10-2004-0100349 A | 12/2004 |
| WO | 2017/141869 A1 | 8/2017 |

OTHER PUBLICATIONS

International Search Report and Written Opinion dated Apr. 7, 2020, received for PCT Application PCT/JP2020/007251 (Year: 2020).*
International Search Report and Written Opinion dated Apr. 7, 2020, received for PCT Application PCT/JP2020/007251, Filed on Feb. 21, 2020, 8 pages including English Translation.

* cited by examiner

MAGNETIC MARKER DIAGNOSTIC SYSTEM AND DIAGNOSTIC METHOD

CROSS-REFERENCE TO RELATED APPLICATIONS

The present application is based on PCT filing PCT/JP2020/007251, filed Feb. 21, 2020, which claims priority to JP 2019-031100, filed Feb. 23, 2019, the entire contents of each are incorporated herein by reference.

TECHNICAL FIELD

The present invention relates to a system and a method diagnosing magnetic markers laid in or on a road.

BACKGROUND ART

Conventionally, marker detection systems for utilizing magnetic markers laid in a road for vehicle control have been known (for example, refer to Patent Literature 1). If, for example, magnet markers laid along a lane are detected by utilizing this marker detection system, various driving assists can be achieved, such as automatic steering control, lane departure warning, and automatic driving.

CITATION LIST

Patent Literature

Patent Literature 1: Japanese Unexamined Patent Application Publication No. 2005-202478

SUMMARY OF INVENTION

Technical Problem

However, the above-described conventional marker detection system has the following problem. That is, there is a problem in which there is a possibility that a magnetic marker is damaged during operation over a long period to cause missing detection or erroneous detection.

The present invention was made in view of the above-described conventional problem, and is to provide a system or a method for diagnosing operation situations of magnetic markers.

Solution to Problem

The present invention is directed to a system or a method which diagnoses operation situations of magnetic markers laid in or on a traveling road so as to be magnetically detectable by a vehicle. In the present invention, the presence or absence of a flaw in a magnetic marker is determined based on a comparison between a magnetic distribution and a marker image.

Advantageous Effects of Invention

According to a combination of the magnetically obtained magnetic distribution and the optically obtained marker image, it is possible to diagnose the magnetic marker with high accuracy, compared with the case in which the magnetic marker is diagnosed by using only a magnetic method or only an optical method.

DESCRIPTION OF EMBODIMENTS

Modes for implementation of the present invention are specifically described by using the following embodiments.

First Embodiment

The present embodiment is an example regarding a method and a system of diagnosing operation situations of magnetic markers 10 laid in a traveling road so as to be detectable by a vehicle. Details of this are described by using FIG. 1 to FIG. 9.

In a diagnostic method for magnetic markers 10 in the present embodiment, the magnitude of magnetism with which magnetic marker 10 (FIG. 1) acts therearound is measured and a one-dimensional magnetic distribution is obtained. Also, by imaging magnetic marker 10, a marker image, which is one-dimensional image information, is obtained. Then, based on a comparison between the magnetic distribution and the marker image, the presence or absence of a flaw in magnetic marker 10 is determined. In the present embodiment, diagnostic vehicle 1 is exemplarily described as one example of a diagnostic system which performs this diagnostic method.

Magnetic marker 10 as a diagnostic target is a road marker laid in road surface 100S (refer to FIG. 1) of the road where diagnostic vehicle 1 travels. Magnetic marker 10 is, for example, arrayed at a pitch of 3 meters along the center of a lane (not depicted) as a traveling section sectioned by left and right lane marks.

Figure 1:
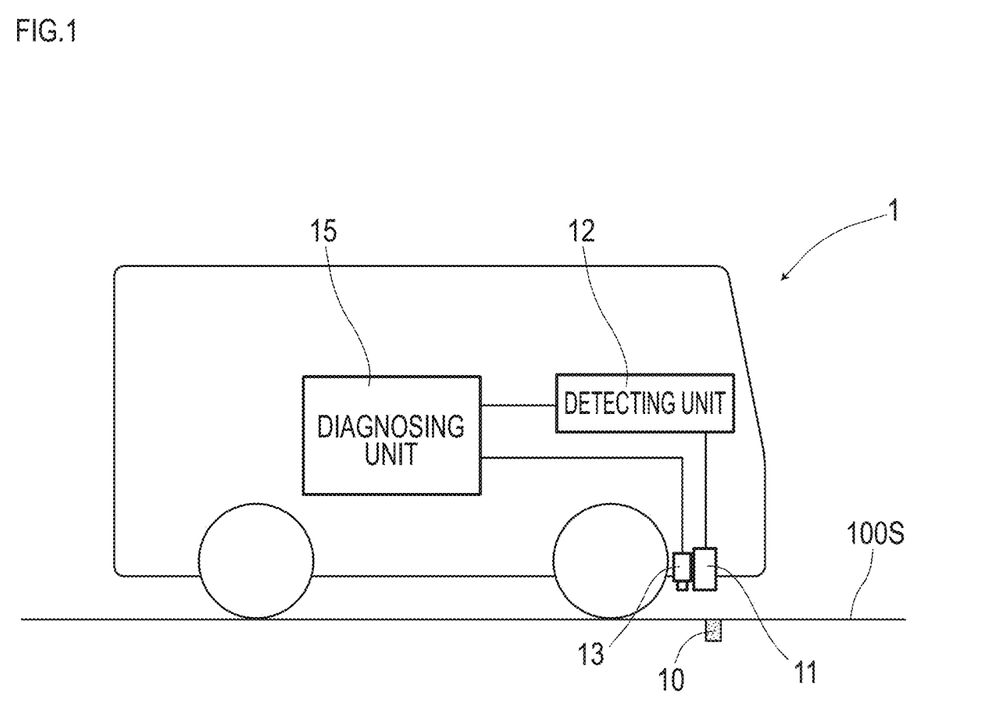
FIG. 1 is a descriptive diagram depicting a diagnostic vehicle which diagnoses a magnetic marker in a first embodiment.
Figure 2:
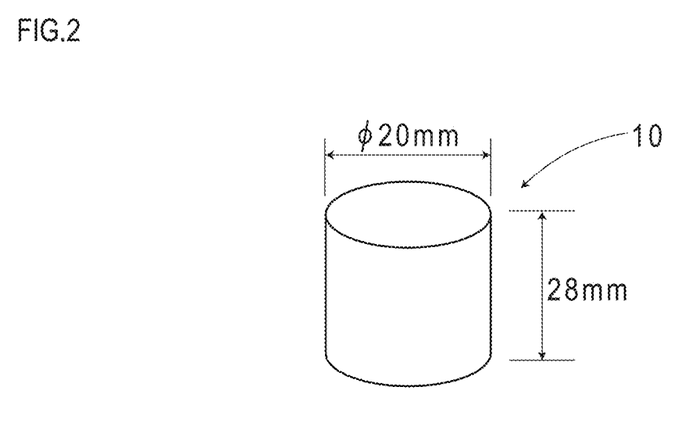
FIG. 2 is a diagram depicting the magnetic marker in the first embodiment.

Magnetic marker 10 forms a columnar shape having a diameter of 20 mm and a height of 28 mm, as depicted in FIG. 1 and FIG. 2. Magnetic marker 10 is laid, in a state in which its upper end face is flush with road surface 100S, as being accommodated in a hole bored into road surface 100S. On road surface 100S of the road where magnetic markers 10 are laid, a pattern of a circular shape having a diameter of 20 mm formed by the upper end face of magnetic marker 10 appears.

A magnet forming magnetic marker 10 is a ferrite plastic magnet with magnetic powder of iron oxide as a magnetic material dispersed in a polymer material as a base material. This magnet has a property of a maximum energy product (BHmax)=6.4 kJ/m$^3$.

Specifications of magnetic marker 10 of the present embodiment are partially depicted in Table 1.

TABLE 1

| Type of magnet | Ferrite plastic magnet |
| --- | --- |
| Diameter | φ 20 mm |
| Height | 28 mm |
| Magnetic flux density Gs at the surface | 45 mT |

In diagnostic vehicle 1, as an attachment height of sensor unit 11, which will be described further below, for measuring magnetism, a range from 100 mm to 250 mm is assumed. Magnetic marker 10 can act with magnetism of a magnetic flux density of 8 µT (microtesla) at an upper-limit height of 250 mm in this range from 100 mm to 250 mm. Note that magnetic flux density Gs at the surface of the magnet forming magnetic marker 10 is 45 mT (millitesla).

Figure 3:
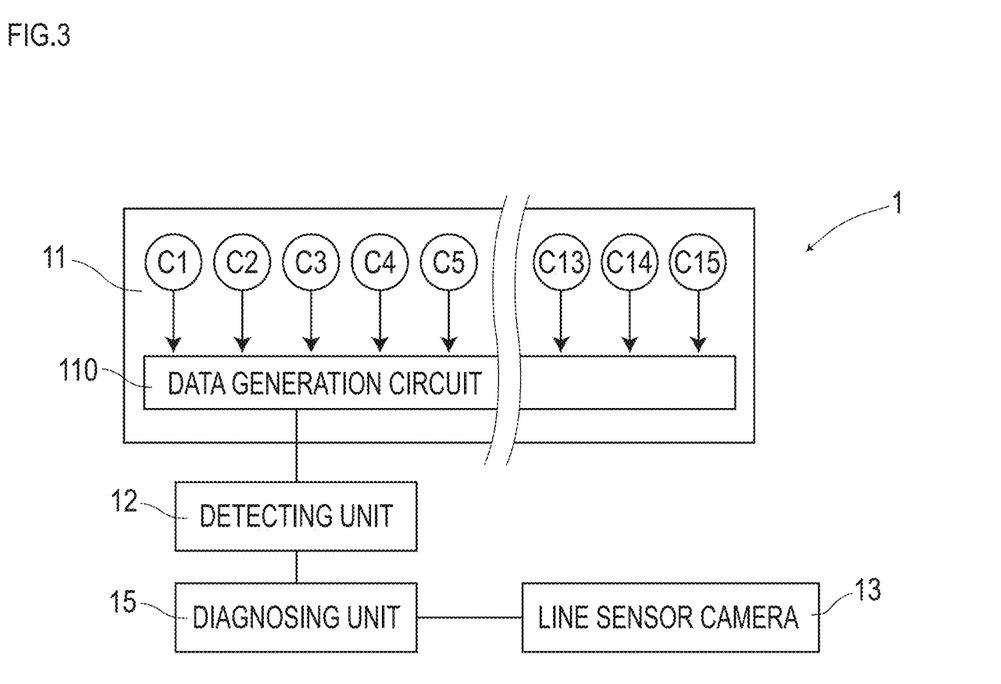
FIG. 3 is a block diagram depicting the configuration of a diagnostic system in the first embodiment.

Diagnostic vehicle 1 includes, as in FIG. 1 and FIG. 3, sensor unit 11 including magnetic sensors Cn, detecting unit 12 which detects magnetic marker 10, line sensor camera 13 for imaging magnetic marker 10, diagnosing unit 15 which determines the presence or absence of the flaw in magnetic marker 10, and so forth. In the following, each configuration of diagnostic vehicle 1 is described.

(Sensor Unit)

Sensor unit 11 (FIG. 3) is a magnetic detecting unit forming one example of a magnetic measuring part. Sensor unit 11 is attached to, for example, the inside the front bumper of the vehicle, with an orientation facing road surface 100S. In the case of diagnostic vehicle 1 of the present embodiment, the attachment height with reference to road surface 100S is 200 mm.

Sensor unit 11 includes fifteen magnetic sensors Cn arrayed at a pitch of 10 cm along a vehicle-width direction and data generation circuit 110 which generates output data. Sensor unit 11 is attached so that magnetic sensor C8 at the center of fifteen magnetic sensors Cn is positioned at the center of diagnostic vehicle 1 in the vehicle-width direction.

Data generation circuit 110 is a circuit which generates magnetic distribution data indicating a one-dimensional magnetic distribution of magnetic measurement values in the vehicle-width direction by magnetic sensors Cn and externally outputs the data. Data generation circuit 110 causes each magnetic sensor Cn to operate in synchronization and sequentially reads the magnetic measurement values measured at the same timing by each magnetic sensor Cn to generate magnetic distribution data in the vehicle-width direction. Note that the frequency at which sensor unit 11 (data generation circuit 110) of the present embodiment generates magnetic distribution data is 3 kHz.

Magnetic sensors Cn as one example of a magnetic detecting part are MI sensors which measure magnetism by utilizing the known MI effect (Magnet Impedance Effect) in which the impedance of a magneto-sensitive body such as an amorphous wire sensitively changes in response to the external magnetic field. Magnetic sensors Cn are configured so as to be able to detect the magnitude of magnetic components in two orthogonal directions. In sensor unit 11, magnetic sensors Cn are incorporated so as to be able to sense magnetic components in a forwarding direction and magnetic components in the vehicle-width direction of diagnostic vehicle 1. Data generation circuit 110 can generate two types of magnetic distribution data in the vehicle-width direction described below.

(First Magnetic Distribution Data)

Magnetic distribution data, which is the distribution of magnetic measurement values in the forwarding direction measured by each magnetic sensor Cn configuring sensor unit 11 (distribution in the vehicle-width direction).

(Second Magnetic Distribution Data)

Magnetic distribution data, which is the distribution of magnetic measurement values in the vehicle-width direction measured by each magnetic sensor Cn configuring sensor unit 11 (distribution in the vehicle-width direction).

Magnetic sensors Cn have a measurement range of the magnetic flux density of ±0.6 mT and achieve high sensitivity with a magnetic flux resolution of 0.02 µT within the measurement range. As described above, magnetic marker 10 (FIG. 1) acts with magnetism on the order of 8 µT at 250 mm as the upper limit of the range assumed as the attachment height of sensor unit 11. With magnetic sensors Cn having the magnetic flux resolution of 0.02 µT, magnetism of magnetic marker 10 can be sensed with high reliability.

Specifications of magnetic sensors Cn are partially depicted in Table 2.

TABLE 2

| Measurement range | ±0.6 mT |
| --- | --- |
| Magnetic flux resolution | 0.02 µT |
| Sampling frequency | 3 kHz |

(Detecting Unit)

Detecting unit 12 (FIG. 3) is an arithmetic unit which performs various arithmetic processes by obtaining the above-described first and second magnetic distribution data from sensor unit 11. Detecting unit 12 is configured to include a CPU (central processing unit) which performs arithmetic process, memory elements such as a ROM (read only memory) and a RAM (random access memory), and so forth.

Detecting unit 12 performs various arithmetic processes on the first and second magnetic distribution data. The arithmetic processes include a marker detection process for detecting magnetic marker 10, and so forth. In this marker detection process, although details will be described further below, magnetic marker 10 is detected by utilizing the first magnetic distribution data, and a lateral shift of diagnostic vehicle 1 measured with respect to magnetic marker 10 is measured by utilizing the second magnetic distribution data.

In addition to marker detection information on which the result of the marker detection process is reflected, detecting unit 12 inputs the above-described first and second magnetic distribution data to diagnosing unit 15. The marker detection information includes at least an indication that magnetic marker 10 has been detected, a marker detection time, a lateral shift, and so forth. The first and second magnetic distribution data is inputted to diagnosing unit 15 at the frequency of 3 kHz, which is the frequency of generation of magnetic distribution data by sensor unit 11.

(Line Sensor Camera)

Line sensor camera 13 forms one example of an imaging part which images magnetic marker 10 and, for example, is attached to the bottom surface of diagnostic vehicle 1. Line sensor camera 13 has imaging elements (not depicted) arrayed on a straight line, and its imaging area is one-dimensional. In this respect, it is different from an area sensor camera having imaging elements two-dimensionally arrayed. Line sensor camera 13 is adjacent to sensor unit 11 in the longitudinal direction of diagnostic vehicle 1 (refer to FIG. 1), and is attached at a position corresponding to the center of diagnostic vehicle 1 in the vehicle-width direction. The optical axis of line sensor camera 13 is oriented directly below so as to be able to image road surface 100S. The imaging area of this line sensor camera 13 covers a magnetic detection area by sensor unit 11. Line sensor camera 13 performs imaging operation at the frequency of 3 kHz in synchronization of timing of generation of magnetic distribution data by sensor unit 11, and inputs, for every imaging, one-dimensional image data forming one-dimensional image information to diagnosing unit 15.

Note that if a distance between line sensor camera 13 and road surface 100S is not sufficiently ensured, the entire detection area of the sensor unit 11 may not be covered by only one camera. In this case, for example, as with magnetic sensors Cn in sensor unit 11, a plurality of line sensor cameras may be arrayed along the vehicle-width direction. It is preferable that one-dimensional images of the plurality of line sensor cameras be synthesized to generate a one-dimensional image elongated in the vehicle-width direction.

To ensure the distance to road surface 100S, the imaging part such as the line sensor camera may be attached to an upper part (for example, near the roof) of the front surface or the rear end surface of diagnostic vehicle 1. In this case, the imaging part such as the line sensor camera may be disposed at a position different from that of the sensor unit. In this case, however, it is preferable to provide a storage part which stores information indicating a positional relation between the imaging area by the imaging part and a reference point in the detection area by the sensor unit.

In the magnetic detection area by the sensor unit, the outer edge of the area is unclear. Thus, as a reference point of the detection area, a position corresponding to the center of the sensor unit, a position directly below specific magnetic sensor Cn, or the like may be set. On the other hand, in the imaging area, unlike the detection area by the sensor unit, the outer edge of the area is clear. The positional relation of the imaging area with respect to the reference point of the detection area may be a positional relation between the reference point of the detection area and the center of the imaging area or a distance between the reference point of the detection area and the imaging area. The information indicating the positional relation includes information about positional shift in the forwarding direction (longitudinal direction) and the vehicle-width direction of the vehicle, and so forth.

It is preferable that a processing part be provided which estimates a motion of a vehicle (such as a diagnostic vehicle) between the time when the imaging part takes an image of a specific area and the time when the sensor unit obtains a magnetic distribution of that area. The motion of the vehicle represented by a movement vector, a turning-round angle, or the like can be estimated from the vehicle speed, steering-wheel's steering angle, yaw rate, or the like. Furthermore, a processing part may be provided which performs process to make the detection area by the sensor unit correspond to the imaging area based on the positional relation between the reference point in the detection area by the sensor unit and the imaging area of the imaging part and the estimation result of the vehicle's motion. If this configuration is adopted, even a vehicle with the imaging part and the sensor unit disposed at different positions can perform a comparison between the magnetic distribution and the marker image with high accuracy. This can improve flexibility to install the imaging part and the sensor unit.

(Diagnosing Unit)

Diagnosing unit 15 is a unit forming one example of a diagnosing part including a function of determining the presence or absence of the flaw in magnetic marker 10. Diagnosing unit 15 determines the presence or absence of the flaw in magnetic marker 10 based on a comparison between the magnetic distribution by sensor unit 11 and the marker image by line sensor camera 13. Diagnosing unit 15 is configured to include a CPU which performs arithmetic process, memory elements such as a ROM (read only memory) and a RAM (random access memory), and so forth.

Diagnosing unit 15 obtains marker detection information and magnetic distribution data from detecting unit 12 and also obtains one-dimensional image data by line sensor camera 13. Diagnosing unit 15 can store the magnetic distribution data and one-dimensional image data over a previous predetermined period. Upon obtaining new magnetic distribution data or one-dimensional image data, diagnosing unit 15 deletes the most obsolete data to secure a data free area and stores the new magnetic distribution data or one-dimensional image data. With this, diagnosing unit 15 retains the state of storing the magnetic distribution data or one-dimensional image data over the previous predetermined period with reference to the latest time point (current).

Next, a procedure is described in which diagnostic vehicle 1 configured as described above diagnoses magnetic marker 10. First, (1) a marker detection method for detecting magnetic marker 10 is described, and then details of (2) a marker detection process and (3) a magnetic marker diagnostic process are described.

(1) Marker Detection Method

As described above, magnetic sensors Cn of sensor unit 11 can measure magnetic components in the forwarding direction and the vehicle-width direction of diagnostic vehicle 1. For example, when any of magnetic sensors Cn moves in the forwarding direction and passes directly above magnetic marker 10, the magnetic measurement value of any of magnetic sensors Cn in the forwarding direction has its sign reversed before and after magnetic marker 10, and changes so as to cross zero at a position directly above magnetic marker 10, as in FIG. 4. Therefore, during traveling of diagnostic vehicle 1, when zero-cross X1 occurs in which the sign of magnetic measurement value in the forwarding direction detected by any of magnetic sensors Cn is reversed, it can be determined that sensor unit 11 is positioned directly above magnetic marker 10.

Also, for example, as for a magnetic sensor with the same specification as that of magnetic sensors Cn, assume a movement along a virtual line in the vehicle-width direction passing directly above magnetic marker 10. The magnetic measurement value in the vehicle-width direction by this magnetic sensor has its sign reversed on both sides across magnetic marker 10 and changes so as to cross zero at a position directly above magnetic marker 10. In the case of sensor unit 11 having fifteen magnetic sensors Cn arrayed in the vehicle-width direction, as in FIG. 5, the sign of magnetic measurement value in the vehicle-width direction to be detected by magnetic sensors Cn varies depending on which side the unit is present on via magnetic marker 10.

Figure 5:
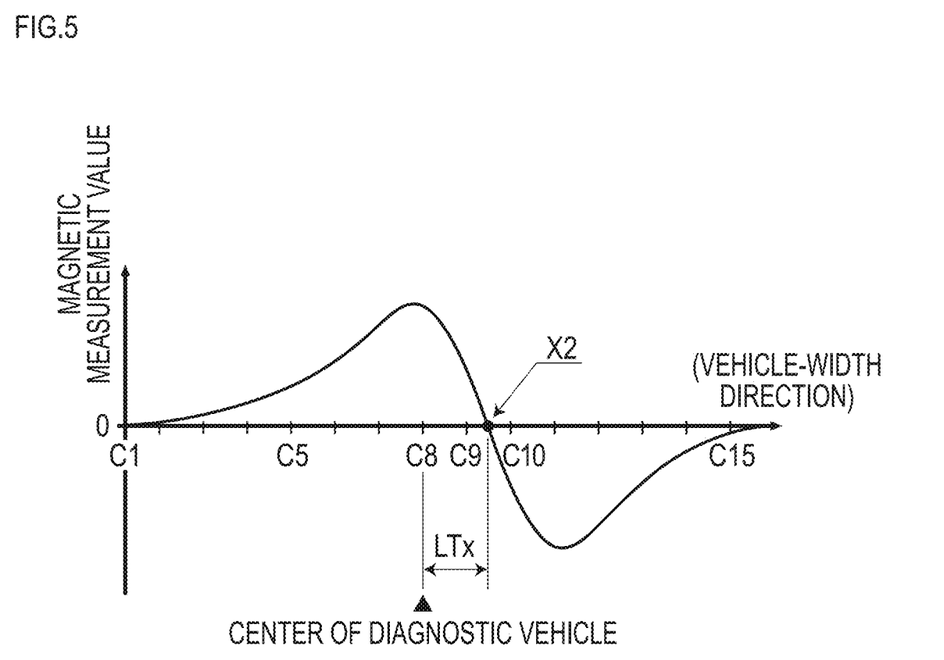
FIG. 5 is a descriptive diagram exemplarily depicting a distribution curve of the magnetic measurement value in a vehicle-width direction by magnetic sensors Cn arrayed in the vehicle-width direction in the first embodiment.

That is, in the distribution curve of the magnetic measurement values in FIG. 5, the position of zero-cross X2 indicates the position directly above magnetic marker 10. For example, in the case of the drawing, the position of zero-cross X2 of C9.5 in the neighborhood of a midpoint between magnetic sensors C9 and C10 is the position directly above magnetic marker 10 (hereinafter referred to as the position of magnetic marker 10). Here, as described above, in sensor unit 11, the pitch between adjacent magnetic sensors Cn is 10 cm, and magnetic sensor C8 is at the center of diagnostic vehicle 1 in the vehicle-width direction. Therefore, in the case of FIG. 5, a position shifted by (9.5−8)×10 cm=15 cm to the right side with reference to the center of diagnostic vehicle 1 in the vehicle-width direction is the position of magnetic marker 10. Note that this position of magnetic marker 10 is handled as position LTx of the center of distribution of the magnetic distribution in a diagnostic process, which will be described further below.

For example, when diagnostic vehicle 1 travels as pulling to the left side in the vehicle-width direction, magnetic marker 10 is shifted to the right side with respect to sensor unit 11 and, for example, as in FIG. 5, the position of zero-cross X2 has a positive value on the right side of magnetic sensor C8. Assuming a lateral shift when diagnostic vehicle 1 pulls to the right side is taken as being on a positive side and a lateral shift when it pulls to the left side is taken as being on a negative side, for example, in the case of FIG. 5, (−15) cm, obtained by reversing the sign of the above-described (9.5−8)×10 cm=15 cm which indicates the position of magnetic marker 10, is the lateral shift of diagnostic vehicle 1.

(2) Marker Detection Process

Figure 6:
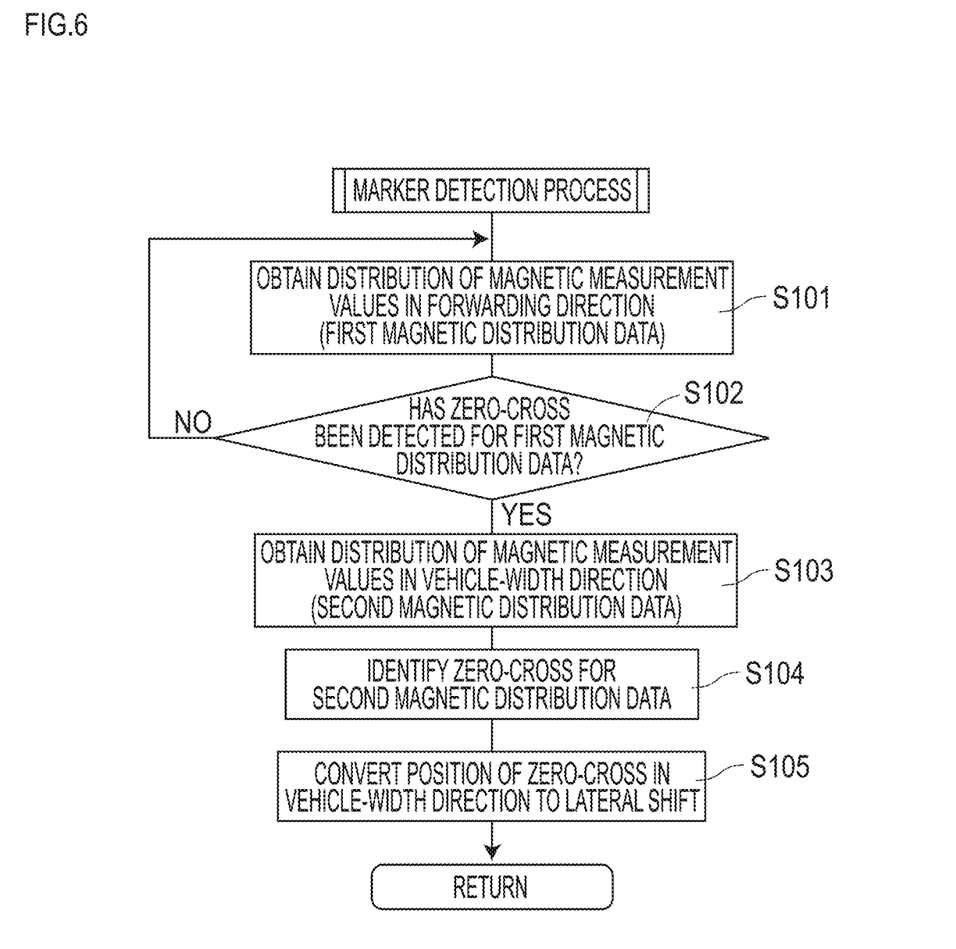
FIG. 6 is a flow diagram depicting a flow of a marker detection process in the first embodiment.

The marker detection process of FIG. 6 is a process of detecting magnetic marker 10 by detecting unit 12. Detecting unit 12 performs the marker detection process by applying the marker detection method of the above-described (1) to the first and second magnetic distribution data obtained from sensor unit 11.

Detecting unit 12 obtains magnetic measurement values in the forwarding direction of the magnetic sensors Cn configuring the above-described first magnetic distribution data (S101). And, detecting unit 12 tries to detect the zero-cross corresponding to X1 in FIG. 4 for changes with time of the magnetic measurement values in the forwarding direction of at least any of magnetic sensors Cn (S102). Detecting unit 12 repeatedly obtains the magnetic measurement value (first magnetic distribution data) in the forwarding direction of magnetic sensors Cn (S101) until it detects this zero-cross (S102: NO).

Figure 4:
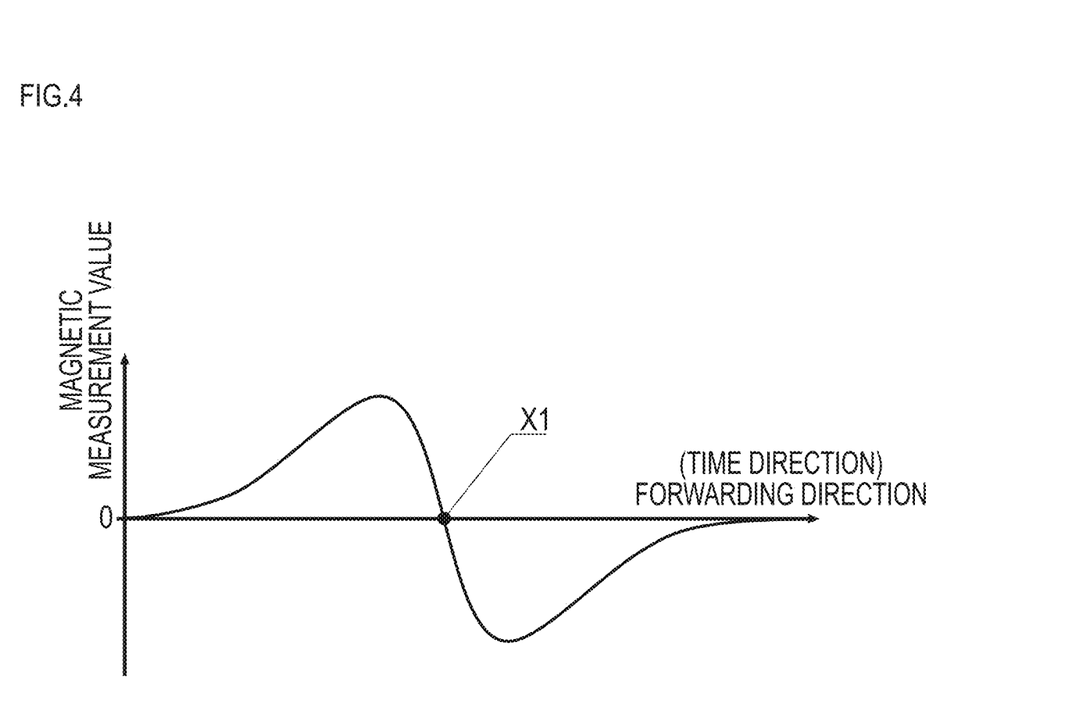
FIG. 4 is a descriptive diagram exemplarily depicting temporal changes of a magnetic measurement value in a forwarding direction at the time of passing over the magnetic marker in the first embodiment.

If having detected the zero-cross corresponding to X1 in FIG. 4 for the changes with time of the magnetic measurement values in the forwarding direction (S102: YES), detecting unit 12 determines that sensor unit 11 is positioned directly above magnetic marker 10, and stores the current time as a marker detection time. Note that as for determination of detection of magnetic marker 10, in addition to detection of the zero-cross corresponding to X1 in FIG. 4, a condition may be set in which a ratio of the changes with time of the magnetic measurement values in the forwarding direction, that is, the magnitude of a derivative value (differential value) of the magnetic measurement values is equal to or larger than a predetermined threshold value.

If having detected magnetic marker 10 in accordance with detection of the zero-cross corresponding to X1 in FIG. 4, detecting unit 12 obtains the above-described second magnetic distribution data indicating a distribution of the magnetic measurement values in the vehicle-width direction of magnetic sensors Cn at the marker detection time (S103, magnetic distribution obtaining process). For the distribution of the magnetic measurement values in the vehicle-width direction of magnetic sensors Cn (magnetic distribution represented by the second magnetic distribution data), detecting unit 12 identifies the position of the zero-cross corresponding to X2 in FIG. 5 in the vehicle-width direction (S104). And, based on this position of the zero-cross in the vehicle-width direction, a lateral shift of diagnostic vehicle 1 in the vehicle-width direction is identified with respect to magnetic marker 10 (S105). Specifically, detecting unit 12 reverses the sign of a value indicating position LTx of the zero-cross corresponding to X2 in FIG. 5 in the vehicle-width direction, and takes the result as a lateral shift in the vehicle-width direction.

(3) Magnetic Marker Diagnostic Process

Details of the process of diagnosing magnetic marker 10 by diagnosing unit 15 are described with reference to FIG. 7. When magnetic marker 10 is detected by detecting unit 12 (S201: YES), diagnosing unit 15 proceeds to step S202 to perform the process of diagnosing magnetic marker 10. Note that based on the marker detection information obtained from detecting unit 12, diagnosing unit 15 can grasp that magnetic marker 10 has been detected. As described above, this marker detection information includes the indication that magnetic marker 10 has been detected, as well as the marker detection time and the lateral shift.

With reference to the storage area for magnetic distribution data over the previous predetermined period, diagnosing unit 15 reads the second magnetic distribution data at the time when magnetic marker 10 is detected (marker detection time) (S202). Then, diagnosing unit 15 identifies position LTx of zero-cross X2 (refer to FIG. 5) in the vehicle-width direction of the magnetic distribution indicated by the second magnetic distribution data as the position of the distribution center in the magnetic distribution. Note that distribution center position LTx in the vehicle-width direction is preferably, for example, the position with reference to the center of diagnostic vehicle 1 in the vehicle-width direction. Note that a value obtained by reversing the sign of the lateral shift included in the marker detection information may be taken as distribution center position LTx.

Figure 8:
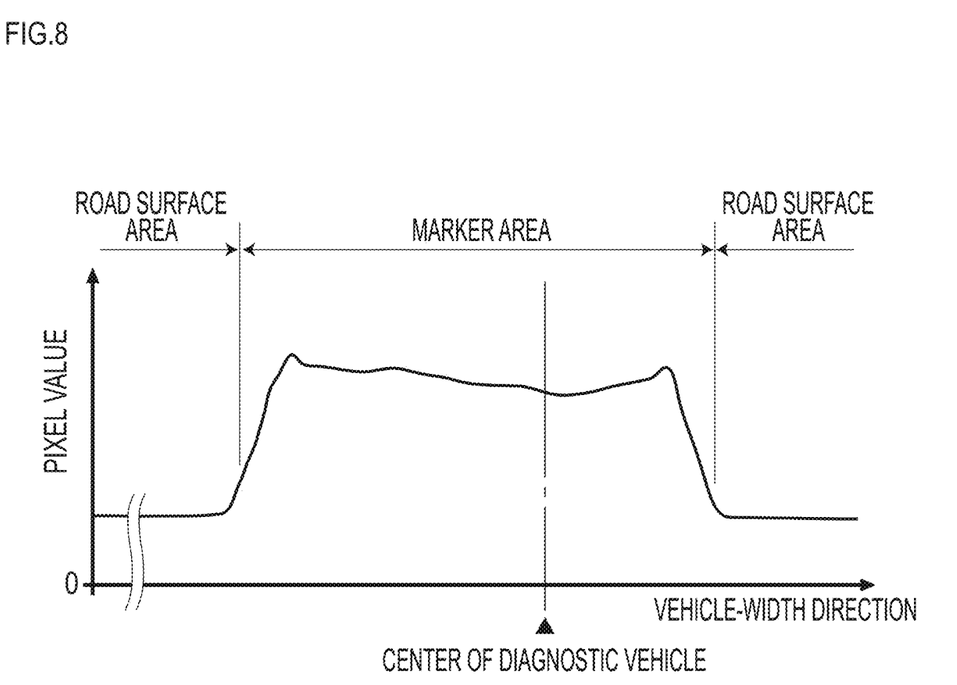
FIG. 8 is a graph exemplarily depicting a marker image in the first embodiment.

Also, with reference to the storage area for the one-dimensional image data stored over the previous predetermined period, diagnosing unit 15 reads one-dimensional image data at the marker detection time as source data of the marker image (S204, image obtaining process). Then, image processing such as an edging process of enhancing the contour and a binarizing process are performed on the marker image, thereby extracting edges, which is a boundary between magnetic marker 10 and road surface 100S. For example, if a difference between values of pixels (pixel values) adjacent to each other in the marker image in FIG. 8 is obtained (one example of the edging process), a processed image in FIG. 9 can be generated, in which the differential value (absolute value) is increased at the boundary between a marker area and a road surface area (image area corresponding to the road surface). For this differential value, which is a pixel value of the processed image, diagnosing unit 15 performs a binarizing process (threshold process) to extract edges (S205).

Figure 9:
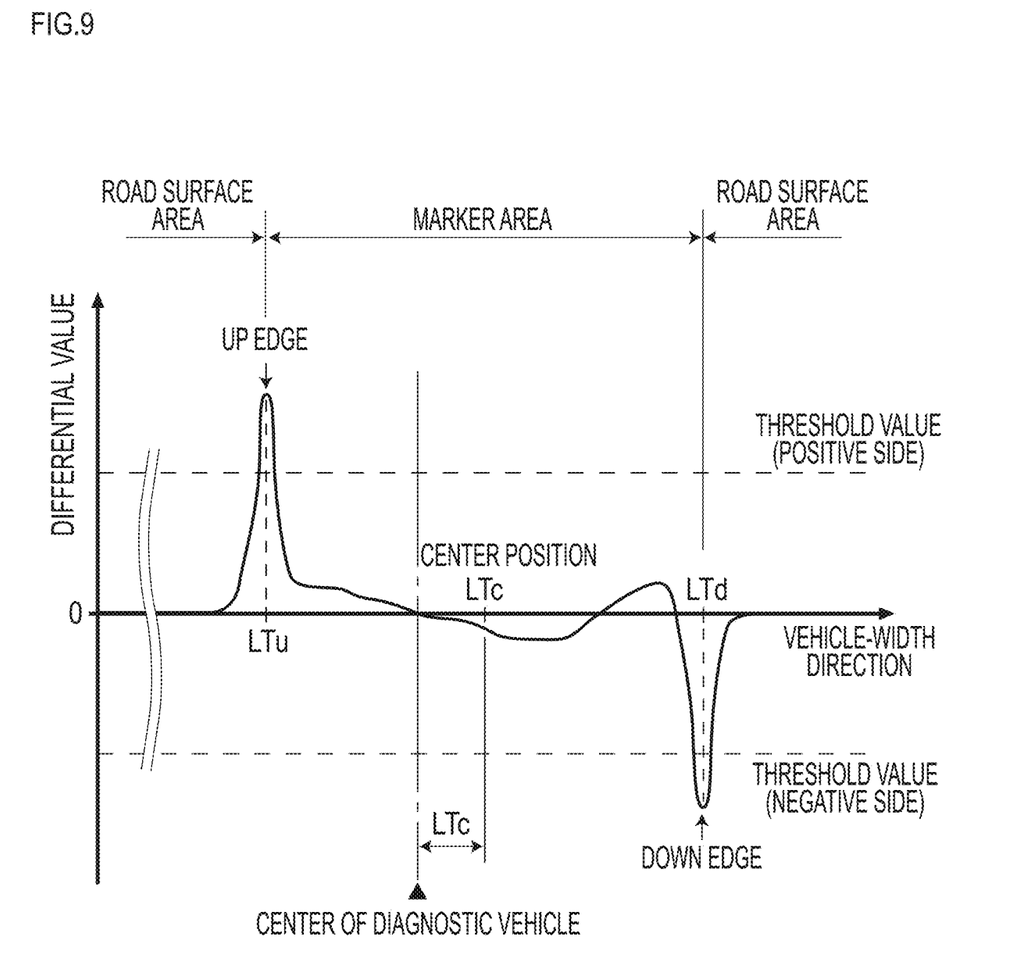
FIG. 9 is a graph exemplarily depicting a processed image with the marker image subjected to edging process in the first embodiment.

For example, as in FIG. 8, when the marker area is brighter and has a larger pixel value than the road surface area, an upedge where the differential value exceeds a threshold value on a positive side is extracted at a position corresponding to the boundary from the road surface area to the marker area (FIG. 9). Also, a downedge where the differential value falls below a threshold value on a negative side is extracted at a position corresponding to the boundary from the marker area to the road surface area (FIG. 9).

Diagnosing unit 15 identifies a position corresponding to a midpoint between position LTu of the upedge in the vehicle-width direction and position LTd of the downedge in the vehicle-width direction as center position LTc, which is the center of the marker area in the vehicle-width direction in the marker image in FIG. 9 (S206). Here, as with distribution center position LTx in the magnetic distribution in FIG. 5, it is preferable to obtain center position LTc with reference to the center of diagnostic vehicle 1 in the vehicle-width direction.

Diagnosing unit 15 performs the threshold process regarding the magnitude (positional deviation) of a difference between distribution center position LTx (FIG. 5) of the magnetic distribution indicated by the second magnetic distribution data and center position LTc (FIG. 9) of the marker area in the vehicle-width direction in the marker image (S207, threshold processing part). When the magnitude of the difference between distribution center position LTx and center position LTc is smaller than a threshold value (S207: YES), diagnosing unit 15 determines that the magnetic distribution is formed on the periphery of magnetic marker 10. Then, in this case, diagnosing unit 15 determines that magnetic marker 10 is normal without a flaw (S208).

On the other hand, when the magnitude of the difference between distribution center position LTx and center position LTc is equal to or larger than the threshold value (S207: NO), diagnosing unit 15 determines that the magnetic distribution is not formed as taking magnetic marker 10 as a center. Then, diagnosing unit 15 determines that the magnetic distribution is disturbed due to some flaw occurring to magnetic marker 10 (S218).

As described above, the magnetic marker diagnostic method of the present embodiment is a method of determining the presence or absence of the flaw in the magnetic marker by comparing the magnetic distribution of the magnetic marker and the marker image, which is a taken image of the magnetic marker. In this diagnostic method, the magnetic distribution and the marker image are compared by paying attention to a positional deviation between distribution center position LTx of the magnetic distribution and center position LTc of the marker area in the marker image. For example, if the magnetic marker has a flaw such as a crack, there is a high possibility of occurrence of a disturbance or unbalance in the magnetic distribution. In this case, there is a high possibility that distribution center position LTx in the magnetic distribution is shifted from center position LTc of the marker area in the marker image. In this manner, according to the diagnostic method of the present embodiment, the flaw in the magnetic marker can be found at a relatively early stage in which although the flaw starts occurring, magnetism detectable on the vehicle side can still be generated. If the flaw in the magnetic marker can be diagnosed early, information indicating that maintenance or inspection is required for the magnetic marker with a suspected flaw can be generated early.

In the present embodiment, for the processed image in FIG. 9 obtained by subjecting the marker image to an edging process of enhancing the contour, the upedge and the downedge are identified, which are boundaries between the marker area and the road surface area. And, the midpoint (center position) between position LTu of the upedge and position LTd of the downedge forming the outer edge of the marker area is handled as center position LTc of the marker area. This midpoint is also an areal center of gravity of the marker area. For the marker area from position LTu of the upedge to position LTd of the downedge, a luminance center of gravity may be obtained and handled as the center of the marker area. In this case, in accordance with a positional shift between the luminance center of gravity and the distribution center (refer to FIG. 5) of the magnetic distribution, it is possible to determine the presence or absence of the flaw in the magnetic marker. Here, the areal center of gravity is an average position of each pixel obtained without consideration of a difference in weight of each pixel belonging to the marker area. The luminance center of gravity is an average position of each pixel obtained by weighting a pixel value (luminance value) of each pixel belonging to the marker area.

Also, symmetry of the marker image with reference to the position corresponding to distribution center position LTx in FIG. 5 may be studied and the magnet marker may be diagnosed with a suspicious flaw when symmetry is not sufficient. As a symmetry index, it is possible to adopt, for example, a difference between integrated values of pixel values on both sides of a position serving as a reference, or the like. When the magnitude of this difference is smaller than a threshold value, it is diagnosed that the magnetic marker does not have a flaw. On the other hand, when it exceeds the threshold value, it can be diagnosed with a suspicious flaw.

In the present embodiment, with magnetic marker 10 laid so that the upper end face of magnetic marker 10 is flush with road surface 100S, magnetic marker 10 is exposed to road surface 100S to be allowed to be imaged. In place of this, while magnetic marker 10 is buried, for example, a mark by painting or the like, a resin-made marker, or the like may be disposed as an eyemark directly above magnetic marker 10. After magnetic marker 10 is accommodated in a hole provided in road surface 100S, a resin-made plug serving as a marker may be put in the hole. In this case, the plug can serve as an eyemark of the magnetic marker. Also, in place of columnar magnetic marker 10 of the present embodiment, a sheet-shaped magnetic marker may be adopted and laminated on road surface 100S. The magnetic marker arranged on road surface 100S can be imaged by a camera or the like.

Second Embodiment

The present embodiment is an example in which the method of determining the presence or absence of the flaw in the magnetic marker is changed based on the configuration of the first embodiment. Details of this are described with reference to FIG. 10.

In the first embodiment, the presence or absence of the flaw in magnetic marker 10 is determined by comparing the marker image as one-dimensional image data and the magnetic distribution. In the present embodiment, a two-dimensional marker image is generated based on one-dimensional image data, and the presence or absence of a flaw is determined by utilizing center C of marker area 10R occupied by the magnetic marker.

Figure 7:
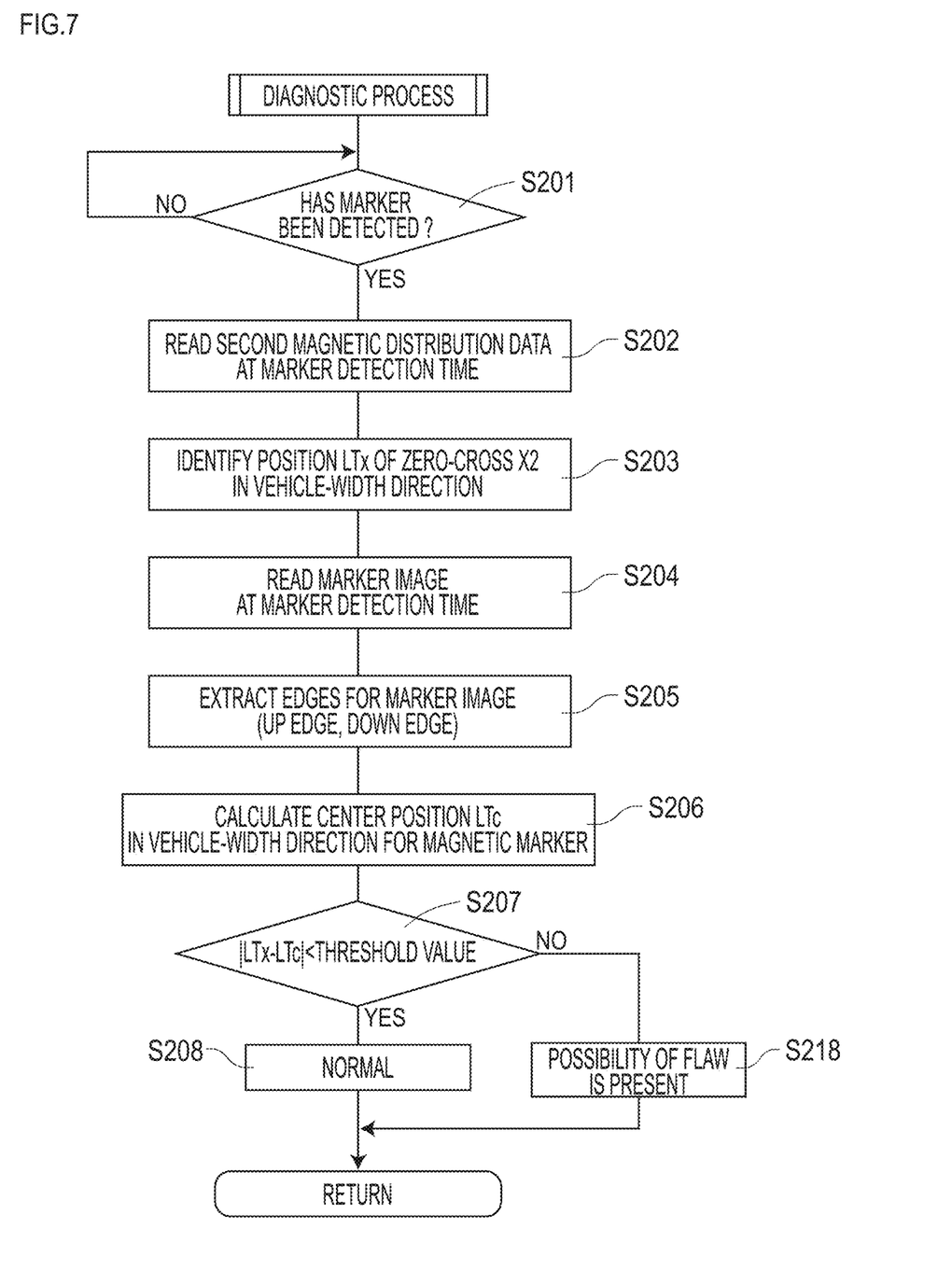
FIG. 7 is a flow diagram depicting a flow of a diagnostic process in the first embodiment.

In place of step S204 in FIG. 7 referred to in the first embodiment, the diagnosing unit of the present embodiment reads a plurality of pieces of one-dimensional image data over a predetermined time with the marker detection time taken as a center time. Note that this predetermined time is set as a time required for the diagnostic vehicle to pass by 20 mm, which is the diameter of the magnetic marker. For example, the predetermined time can be calculated by dividing 40 mm (length with a margin for the diameter of 20 mm) by the traveling speed of the diagnostic vehicle.

The diagnosing unit generates the two-dimensional marker image based on the read plurality of pieces of one-dimensional image data. For example, if the plurality of pieces of one-dimensional image data are stacked in the forwarding direction (time direction), a two-dimensional marker image as in FIG. 10 can be generated. Note that the drawing is a graph with a position in the vehicle-width direction provided on the horizontal axis and a position in the forwarding direction provided on the vertical axis. Point of origin O (O in the alphabet) in the drawing corresponds to the distribution center position (LTx in FIG. 5) at the marker detection time. If an ideal magnetic distribution is formed with the magnetic marker as the center, the center of the magnetic marker in the marker image is positioned at point of origin O.

Figure 10:
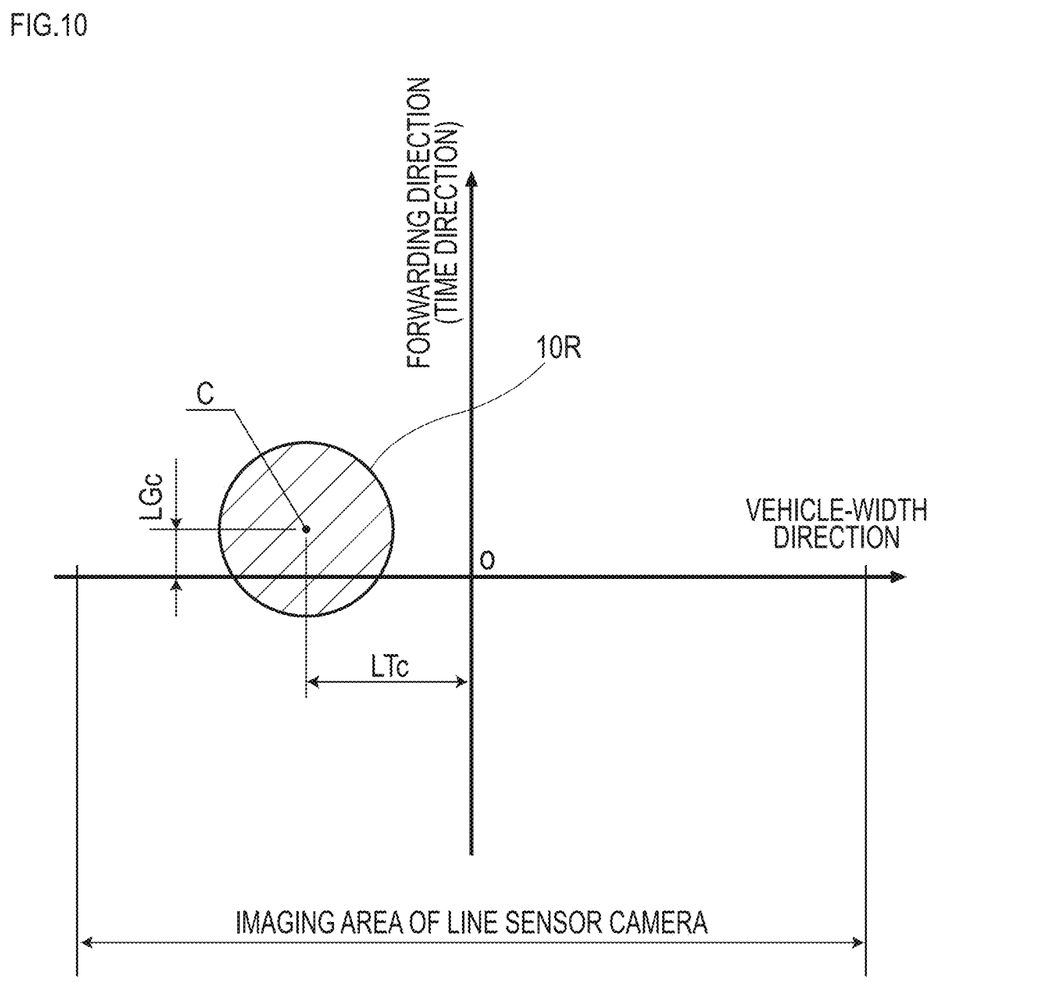
FIG. 10 is a descriptive diagram depicting a two-dimensional marker image in a second embodiment.

The diagnosing unit subjects the marker image in FIG. 10 to image processing to extract marker area 10R, which is an occupied area by the magnetic marker. Then, the diagnosing unit identifies center C of marker area 10R and further identifies position LTc of the center C in the vehicle-width direction and position LGc in the forwarding direction. For example, it may be determined that the magnetic marker does not have a flaw if position LTc in the vehicle-width direction and position LGc in the forwarding direction are both smaller than a threshold value, and it may be determined that there is a possibility that the magnetic marker has a flaw if either is equal to or larger than the threshold value.

Note that the presence or absence of a flaw may be determined by a threshold process regarding the distance from point of origin O to center C. The distance from point of origin O to center C can be calculated by, for example, the trigonometric theorem or the like.

Center C (position of the center) of marker area 10R may be an areal center of gravity or a luminance center of gravity. Furthermore, a position defined by the midpoint of the distribution range of marker area 10R in the vehicle-width direction and the midpoint of the distribution range of marker area 10R in the forwarding direction may be handled as a center (position of the center).

In place of the line sensor camera, an area sensor camera for obtaining a two-dimensional image may be adopted. According to the area sensor camera, a two-dimensional marker image similar to that in FIG. 10 can be obtained. In place of the sensor unit with magnetic sensors one-dimensionally arrayed, a sensor unit with magnetic sensors two-dimensionally arrayed may be adopted. If this sensor unit is adopted as a magnetic measuring part, a two-dimensional magnetic distribution can be obtained.

Note that other configurations and operations and effects are similar to those of the first embodiment.

In the foregoing, specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes technologies acquired by variously modifying, changing, or combining as appropriate the above-described specific examples by using known technologies, knowledge of a person skilled in the art, and so forth.

REFERENCE SIGNS LIST 1 diagnostic vehicle
10 magnetic marker
11 sensor unit (magnetic measuring part)
110 data generation circuit
12 detecting unit (unit)
13 line sensor camera (imaging part)
15 diagnosing unit (diagnosing part)
Cn magnetic sensors (n is an integer of 1 to 15).

The invention claimed is:

1. A magnetic marker diagnostic system which diagnoses operation situations of magnetic markers laid as spaced in or on a traveling road so as to be magnetically detectable by a vehicle, the diagnostic system comprising:
 a magnetic sensor which obtains a one-dimensional or two-dimensional magnetic distribution by measuring a magnitude of magnetism with which any of magnetic markers acts therearound;
 an imaging camera which obtains a marker image, which is one-dimensional or two-dimensional image information, by imaging the magnetic marker; and
 processing circuitry configured to determine presence or absence of a flaw in the magnetic marker based on a comparison of information obtained from the magnetic distribution and other information obtained from the marker image.

2. The magnetic marker diagnostic system in claim 1, comprising:
 a memory which stores information indicating a positional relation between a reference point in a magnetic detection area by the magnetic sensor and an imaging area by the imaging camera, wherein
 the processing circuitry is configured to associate the magnetic detection area with the imaging area based on a result of estimation of a motion of the vehicle and the positional relation between the reference point in the magnetic detection area and the imaging area.

3. The magnetic marker diagnostic system in claim 1, wherein the processing circuitry performs a threshold process regarding a positional deviation between a distribution center in the magnetic distribution and a center of a marker area in the marker image, and is configured to determine presence or absence of the flaw in accordance with the result of the threshold process.

4. The magnetic marker diagnostic system in claim 3, wherein a boundary between the marker area in the marker image and a road surface area corresponding to a road surface, which is a surface of the traveling road is identified, and a position corresponding to a center of the boundary forming an outer edge of the marker area is identified as the center of the marker area.

5. The magnetic marker diagnostic system in claim 3, wherein an average position of each pixel obtained by weighting a pixel value of each pixel belonging to the marker area is identified as the center of the marker area.

6. The magnetic marker diagnostic system in claim 1, wherein the processing circuitry is configured to obtain an index indicating symmetry of the marker image or the marker area with reference to a distribution center in the magnetic distribution and determine presence or absence of the flaw by a threshold process regarding the index.

7. The magnetic marker diagnostic system in claim 1, wherein the magnetic marker is buried at a position deeper than a road surface forming a surface of the traveling road, and the marker image is an eyemark provided on the road surface corresponding to the buried magnetic marker or a taken image of a plug to be put in an accommodation hole bored in the road surface to have the magnetic marker buried therein.

8. The magnetic marker diagnostic system in claim 1, wherein the magnetic marker is a sheet-shaped magnetic marker arranged on a road surface forming a surface of the traveling road, and the marker image is a taken image of the sheet-shaped magnetic marker.

9. A magnetic marker diagnostic method of diagnosing operation situations of magnetic markers laid in or on a traveling road so as to be magnetically detectable by a vehicle, the method comprising:
a magnetic distribution obtaining process of obtaining a one-dimensional or two-dimensional magnetic distribution by measuring a magnitude of magnetism with which any of magnetic markers acts therearound; an image obtaining process of obtaining a marker image, which is a one-dimensional or two-dimensional image, by imaging the magnetic marker; and a diagnostic process of determining presence or absence of a flaw in the magnetic marker based on a comparison of information obtained from the magnetic distribution and other information obtained from the marker image.

10. The magnetic marker diagnostic method in claim 9, wherein the diagnostic process is a process of determining presence or absence of the flaw by threshold determination regarding a positional deviation between a distribution center in the magnetic distribution and a center of a marker area in the marker image.

11. The magnetic marker diagnostic system in claim 2, wherein the processing circuitry performs a threshold process regarding a positional deviation between a distribution center in the magnetic distribution and a center of a marker area in the marker image, and is configured to determine presence or absence of the flaw in accordance with the result of the threshold process.

12. The magnetic marker diagnostic system in claim 11, wherein a boundary between the marker area in the marker image and a road surface area corresponding to a road surface, which is a surface of the traveling road is identified, and a position corresponding to a center of the boundary forming an outer edge of the marker area is identified as the center of the marker area.

13. The magnetic marker diagnostic system in claim 11, wherein an average position of each pixel obtained by weighting a pixel value of each pixel belonging to the marker area is identified as the center of the marker area.

14. The magnetic marker diagnostic system in claim 2, wherein the processing circuitry is configured to obtain an index indicating symmetry of the marker image or the marker area with reference to a distribution center in the magnetic distribution and determine presence or absence of the flaw by a threshold process regarding the index.

15. The magnetic marker diagnostic system in claim 3, wherein the magnetic marker is buried at a position deeper than a road surface forming a surface of the traveling road, and the marker image is an eyemark provided on the road surface corresponding to the buried magnetic marker or a taken image of a plug to be put in an accommodation hole bored in the road surface to have the magnetic marker buried therein.

16. The magnetic marker diagnostic system in claim 6, wherein the magnetic marker is buried at a position deeper than a road surface forming a surface of the traveling road, and the marker image is an eyemark provided on the road surface corresponding to the buried magnetic marker or a taken image of a plug to be put in an accommodation hole bored in the road surface to have the magnetic marker buried therein.

17. The magnetic marker diagnostic system in claim 3, wherein the magnetic marker is a sheet-shaped magnetic marker arranged on a road surface forming a surface of the traveling road, and the marker image is a taken image of the sheet-shaped magnetic marker.

18. The magnetic marker diagnostic system in claim 6, wherein the magnetic marker is a sheet-shaped magnetic marker arranged on a road surface forming a surface of the traveling road, and the marker image is a taken image of the sheet-shaped magnetic marker.

* * * * *